(12) United States Patent
Baik

(10) Patent No.: US 8,071,175 B2
(45) Date of Patent: Dec. 6, 2011

(54) METHOD OF FABRICATING A FOAM PLAY ARTICLE

(75) Inventor: Heui-Jong Baik, Gwangju (KR)

(73) Assignee: Inarex USA, Inc., Whittier, CA (US)

(*) Notice: Subject to any disclaimer, the term of this patent is extended or adjusted under 35 U.S.C. 154(b) by 858 days.

(21) Appl. No.: 12/029,717

(22) Filed: Feb. 12, 2008

(65) Prior Publication Data

US 2009/0202765 A1 Aug. 13, 2009

(51) Int. Cl.
- *B05D 7/02* (2006.01)
- *B05D 1/02* (2006.01)
- *B05D 1/18* (2006.01)
- *B05D 3/02* (2006.01)
- *B29C 44/00* (2006.01)
- *B29C 67/00* (2006.01)

(52) U.S. Cl. .................. 427/402; 427/372.2; 427/421.1; 427/430.1; 264/46.6; 264/46.7; 264/51

(58) Field of Classification Search ............ 264/41, 264/46.4–46.9, 51; 427/421.1, 430.1, 372.2, 427/402; 473/569
See application file for complete search history.

(56) References Cited

U.S. PATENT DOCUMENTS

| | | | | |
|---|---|---|---|---|
| 3,620,864 A * | 11/1971 | Heffner | | 156/79 |
| 3,976,295 A * | 8/1976 | Heald, Jr. | | 473/598 |
| 4,087,501 A * | 5/1978 | Moser | | 264/45.8 |
| 4,351,786 A * | 9/1982 | Mueller | | 264/46.7 |
| 4,367,105 A * | 1/1983 | Rosier et al. | | 156/79 |
| 4,405,537 A * | 9/1983 | Spengler | | 264/45.4 |
| 4,463,951 A * | 8/1984 | Kumasaka et al. | | 473/601 |
| 4,768,678 A * | 9/1988 | Nusbaumer et al. | | 220/567.3 |
| 4,799,982 A * | 1/1989 | Vicino | | 156/71 |
| 5,238,620 A * | 8/1993 | Wu et al. | | 264/45.3 |
| 5,335,907 A * | 8/1994 | Spector | | 473/594 |
| 5,433,438 A * | 7/1995 | Gilman | | 482/93 |
| 5,900,195 A * | 5/1999 | Pool et al. | | 264/46.5 |
| 6,171,533 B1 * | 1/2001 | Adams et al. | | 264/45.2 |

* cited by examiner

*Primary Examiner* — William Phillip Fletcher, III
(74) *Attorney, Agent, or Firm* — Edwards Wildman Palmer LLP; Kongsik Kim

(57) ABSTRACT

A foam play article comprises: an elastic tube for forming an elastic rubber layer; a foam formed by foaming polyurethane materials (2) in the elastic tube (1); and a coating layer (7) coated on the elastic rubber layer. The article may be manufactured by a method which comprises: providing polyurethane foam materials; attaching a material injector (5) to an elastic tube (1); injecting a predetermined amount of the polyurethane foam materials to the elastic tube (1) through the material injector (5); placing the elastic tube (5) in a mold (6) to provide a foam therein; applying a coating layer onto an outer surface of the foam; and drying the coated foam. The-thus formed play article has superior surface gloss, improved waterproof, soft tactile sensation, and higher stability.

14 Claims, 6 Drawing Sheets

METHOD OF FABRICATING A FOAM PLAY ARTICLE

TECHNICAL FIELD

The present invention relates to a foam play article fabricated using polyurethane foam and a fabrication method thereof, and more particularly, a foam play article in which a rubber layer having improved elasticity is formed thereon and then coating and sticker finishing processes are performed, and a fabrication method thereof.

BACKGROUND ART

In typical play articles including a ball, an outer surface of the play articles is covered with rubber materials. An air injection hole is formed in the outer surface, and a predetermined amount of air is injected to maintain its proper form.

The play articles can be able to bounce by pressure of air. They are used for various exercises and activities.

However, the play articles are not reusable if the outer surface fabricated using the rubber materials is damaged. In case of a ball or similar articles, a noise may occur when it explodes by instantaneous pressure. They do not maintain the proper form when air minutely leaks from the air injection hole. In case of a ball, its intrinsic function is lost.

As a way to solve these problems, the play articles have been fabricated using a polyurethane foam process, and then the foamed surface is coated using coating solution or applied with a sticker which has the same surface as the play articles.

However, such conventional play articles still have some problems. For example, the foam of the articles has a relatively low elasticity. It has a water absorptivity which is so high as to make the articles unsuitable for use in water. The articles with the foams have a poor surface coating and closing processes.

The above information disclosed in this Background Art section is only for enhancement of understanding of the background of the invention and therefore it may contain information that does not form the prior art that is already known in this country to a person of ordinary skill in the art.

SUMMARY OF THE DISCLOSURE

Accordingly, the present invention has been made to provide a foam play article fabricated using polyurethane foam and a fabrication method thereof that obviates one or more of the above-described problems.

An object of the present invention is to provide a foam play article in which a polyurethane material is added to a elastic tube such as a balloon, the elastic tube adding the polyurethane material throws in a mold and then foamed in the mold, burnish coating and sticker closing processes are performed to enhance quality and a waterproof function and a fabrication method thereof.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a foam play article including: an elastic tube for forming an elastic rubber layer; a foam formed by foaming polyurethane materials (2) in the elastic tube (1); and a coating layer (7) coated on the elastic rubber layer.

In another aspect, the present invention provides a method of fabricating a foam play article, the method comprising: providing polyurethane foam materials; attaching a material injector (5) to an elastic tube (1); injecting a predetermined amount of the polyurethane foam materials to the elastic tube (1) through the material injector (5); placing the elastic tube (5) in a mold (6) to provide a foam therein; applying a coating layer onto an outer surface of the foam; and drying the coated foam.

The play article configured and fabricated as described above has superior surface gloss, improved waterproof, soft tactile sensation, the same elasticity as an air injected ball, and higher stability, thereby producing safety children products.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
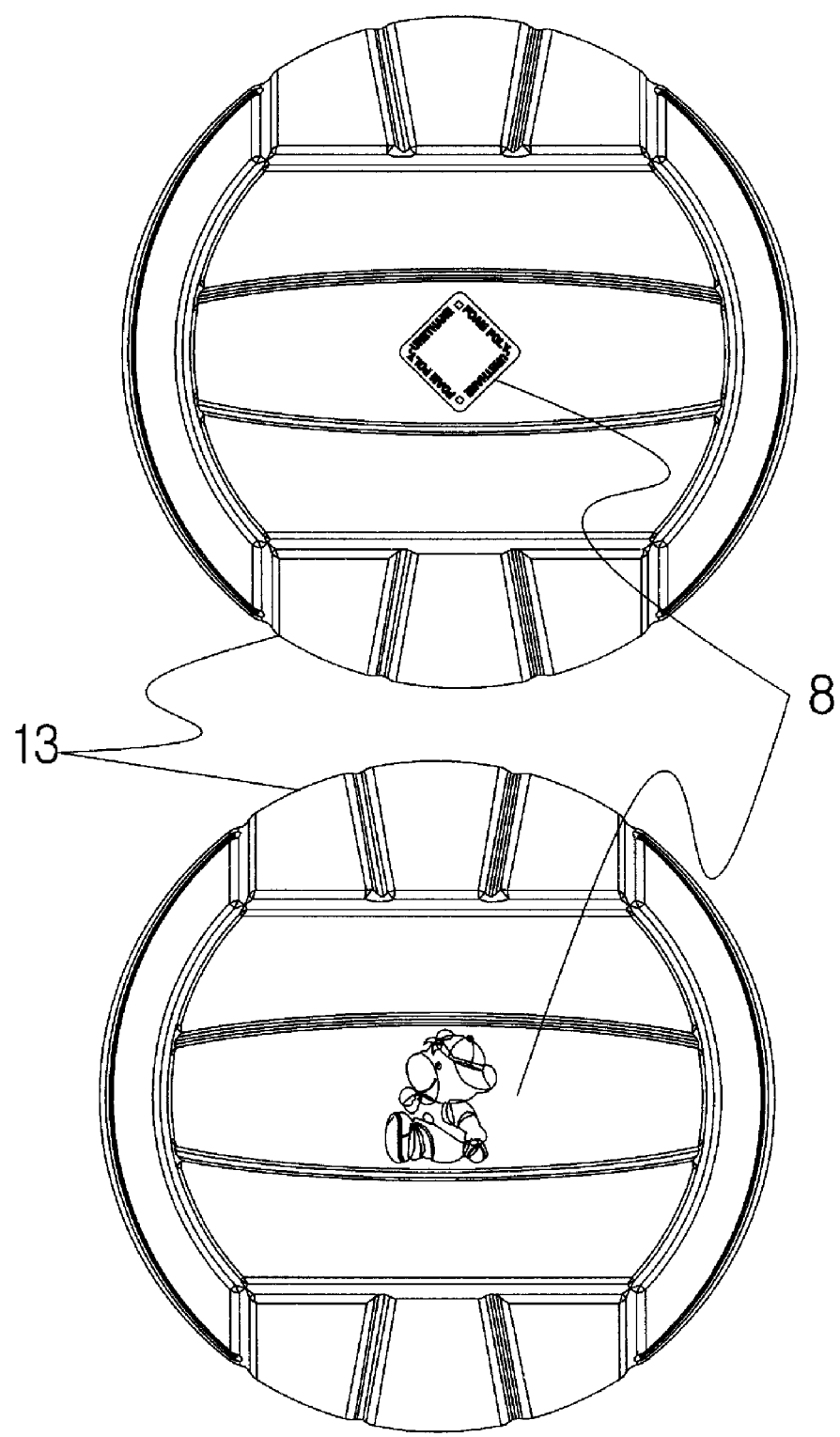
FIG. 1 is a perspective view of a foam play article fabricated according to a preferred embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

According to preferred embodiments of the present invention, it is characterized in that elastic tube 1 such as a balloon is placed inside a mold 6 having a predetermined shape, a polyurethane materials 2 mixed at a predetermined ratio are foamed into the tube to form an elastic waterproof rubber layer, and then the foam having the elastic waterproof rubber layer is finished using burnish coating and sticker closing processes.

The fabrication method, preferably, includes: mixing polyurethane materials supplied from a low pressure dispenser at a predetermined ratio in a high speed mixing head; attaching a material injector 5 to an elastic tube for injecting the mixed materials into the elastic tube 1; injecting a predetermined amount of the mixed materials into the elastic tube 1; placing the elastic tube 1 in a mold 6; removing a gas that is generated while a foam is formed; removing the material injector 5 from the foam and fixing a hanger for being fixed on a conveyer to the foam; applying a primary coating layer having a predetermined thickness onto an outer cover of the foam; drying the coated foam to vulcanize the primary coating layer; removing the hanger from the foam; cutting the material injector out of the elastic tube 1 and attaching a sticker 8 thereto; applying a secondly coating layer onto the foam; and drying the coated foam to vulcanize the secondary coating layer.

Hereinafter, the fabrication method according to the preferred embodiment will be described in more detail.

Figure 5:
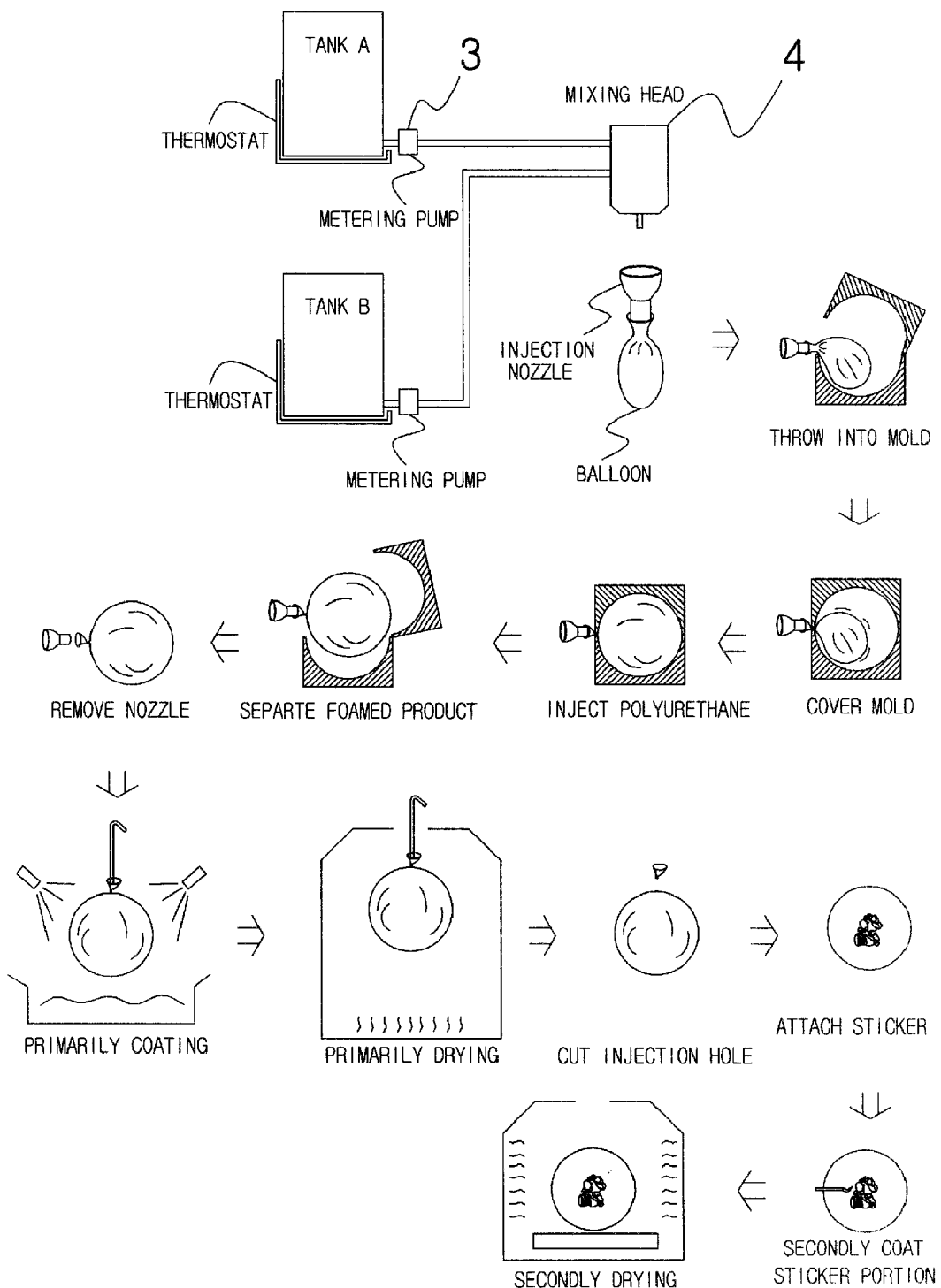
FIG. 5 is a schematic order of a fabrication method according to the present invention.
Figure 6:
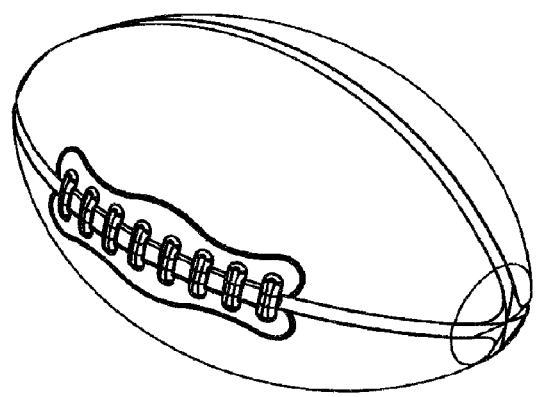
FIG. 6 illustrates exemplary article fabricable according to a preferred embodiment of the present invention.
Figure 6:
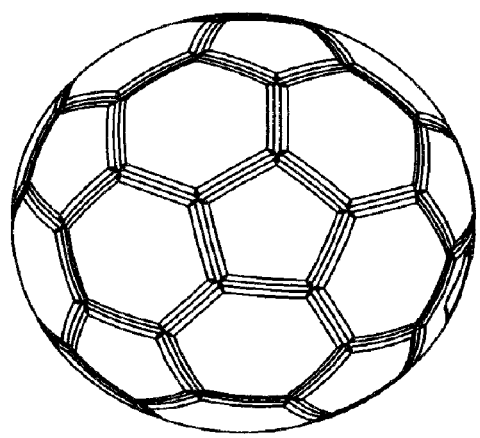
Figure 6:
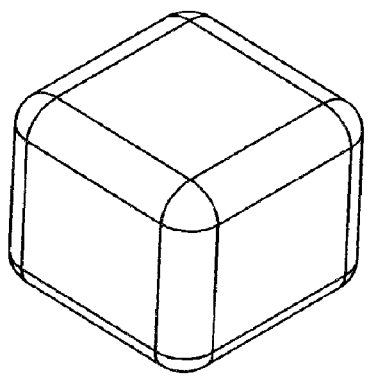

A plurality of material tanks may be used to mix polyurethane foam materials. For example, as shown in FIG. 5, material tanks A and B may be used. The material tank A contains a predetermined amount of liquid methylene diisocyanate, which is one of the main materials of polyurethane. The temperature of the material tank A is maintained at a temperature that enables a chemical reaction. The material tank B contains polypropylene glycol and polymer polyol, additional materials such as amine polyol, tri-ethylene diamine, silicone surfactant, and diethanol amine, and a foaming agent such as chlorofluorohydro-carbon (CFC) at a predetermined ratio. Likewise, the temperature of the material tank B is maintained at a temperature that enables a chemical reaction.

A preferable mixing ratio of the polyurethane foam materials is about 10-50 wt % of the material(s) contained in the tank A to about 50-90 wt % of the material(s) contained in the tank B.

Suitably, the material tank B contains about 50-90% of ploy propylene glycol, about 10-50 wt % of polymer polyol, about 0.1-10 wt % of tri-ethylene diamine, about 0.1-10 wt % of silicone surfactant, and 0.1-10 wt % of diethanol amine, and 0.1-10 wt % of the foaming agent.

Each of the tanks A and B is provided with a metering pump to ensure a precise mixing ratio and a thermostat to maintain an optimum temperature for the chemical reaction of the materials. The materials of the material tanks A and B are supplied to a high speed mixing head supplied through the metering pumps such that the materials are mixed at an optimum condition.

Figure 4:
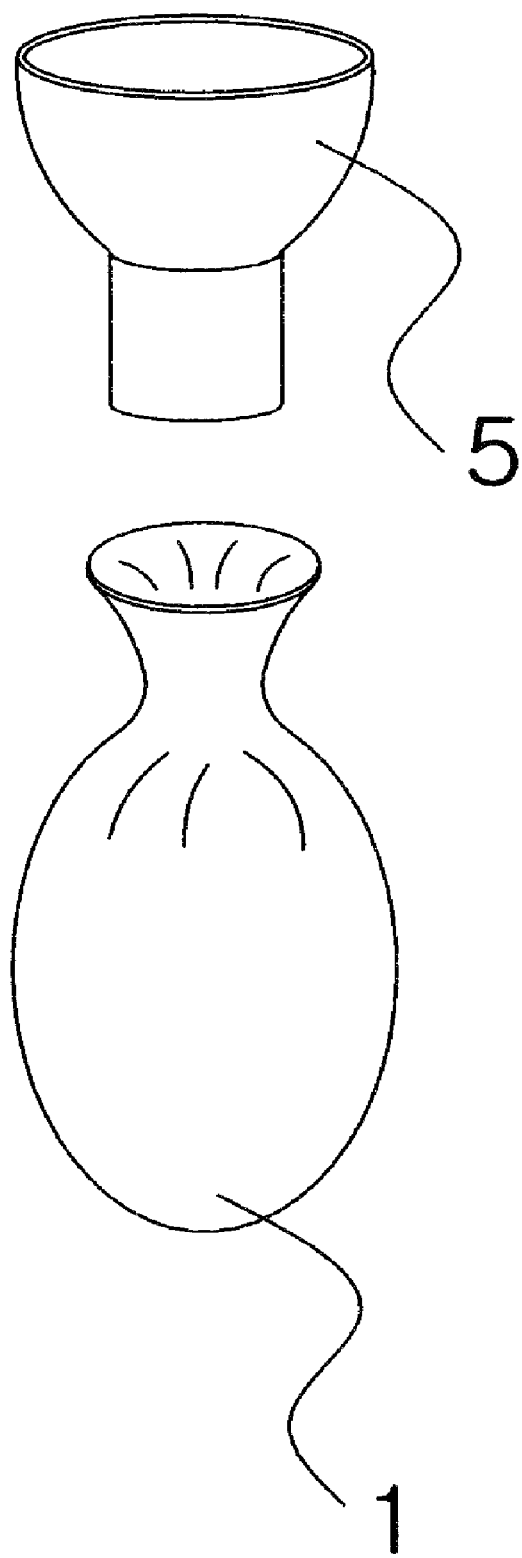
FIG. 4 is a perspective view illustrating a material injector of an elastic tube according to a preferred embodiment of the present invention.

As shown in FIG. 4, a material injector 5 specially designed in a funnel shape is attached to an elastic tube 1 in a manner that foam materials can be securely injected into an injection hole of the elastic tube.

The mixed materials are injected with a certain quantity into the elastic tube through a nozzle (not shown) provided in a control device that can control injection time and injection pressure of the mixture. Preferably, about ⅕~about 1/15 of the volume of the foam is injected although the ratio varies according to the kind of a foam and a mold used.

The mold is opened and then the tube containing therein the mixture is mounted inside the mold. The mold is closed and then the foam is fabricated after about 5~15 minutes. The thus-formed foam has a predetermined size and elasticity, which depends on many factors such as a mixture ratio and temperature of the materials and impurity (e.g., moisture) content.

Figure 3:
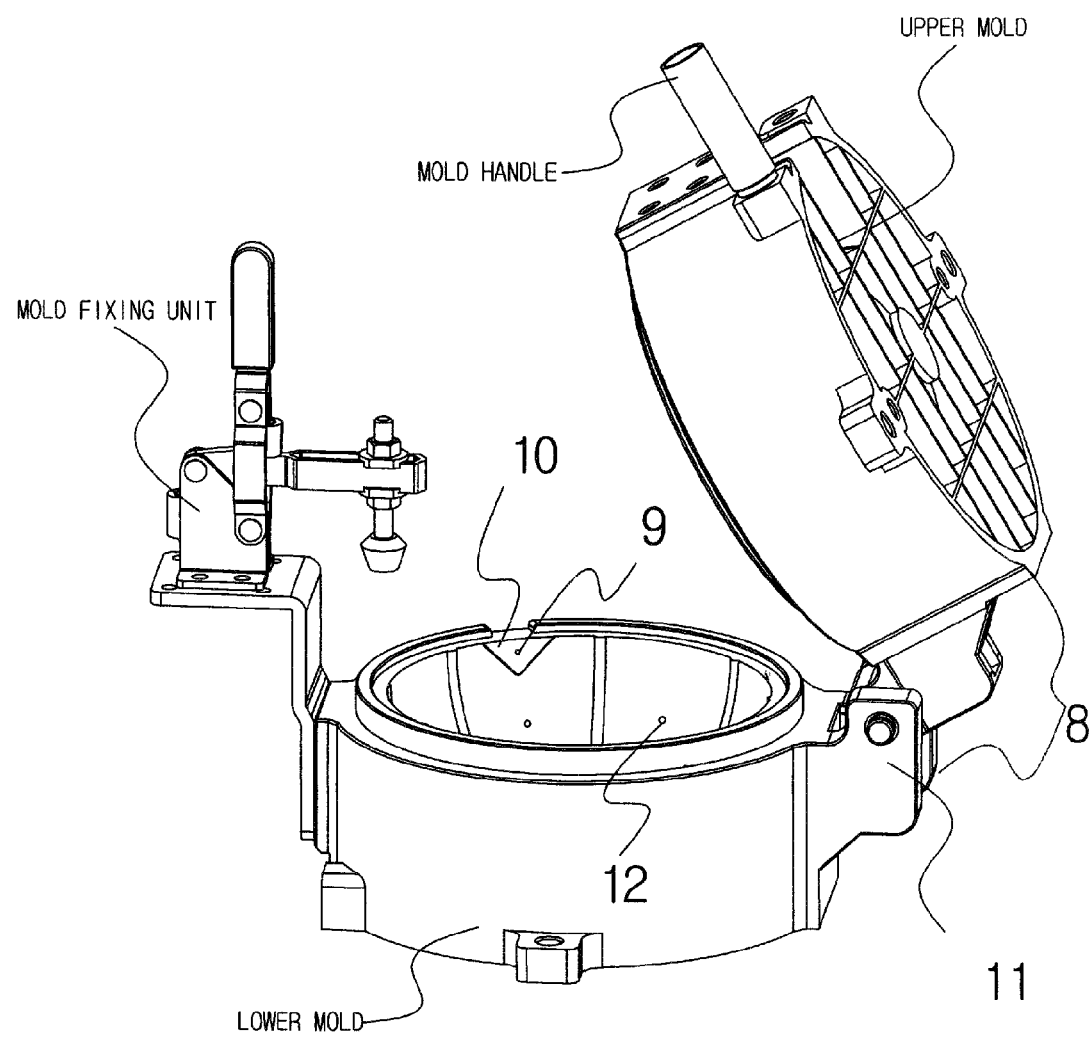
FIG. 3 is a perspective view of a foam mold according to a preferred embodiment of the present invention.

As shown in FIG. 3, the mold has a hinge structure for opening and closing the mold. The mold is made of aluminum or another materials having thermal conductivity similar to aluminum in order to adjust the chemical reaction of the materials. The mold has a gas ventilation hole 9 for removing gases that is generated during the foam process, an air hole 12 for accurately forming the inner surface of the mold, and an cavity 10 to which the sticker 8 for the finishing process is attached. Preferably, the mold is manufactured by a die casting method or an injection molding method particularly when mass production and/or smooth mold parting surface is required.

Figure 2:
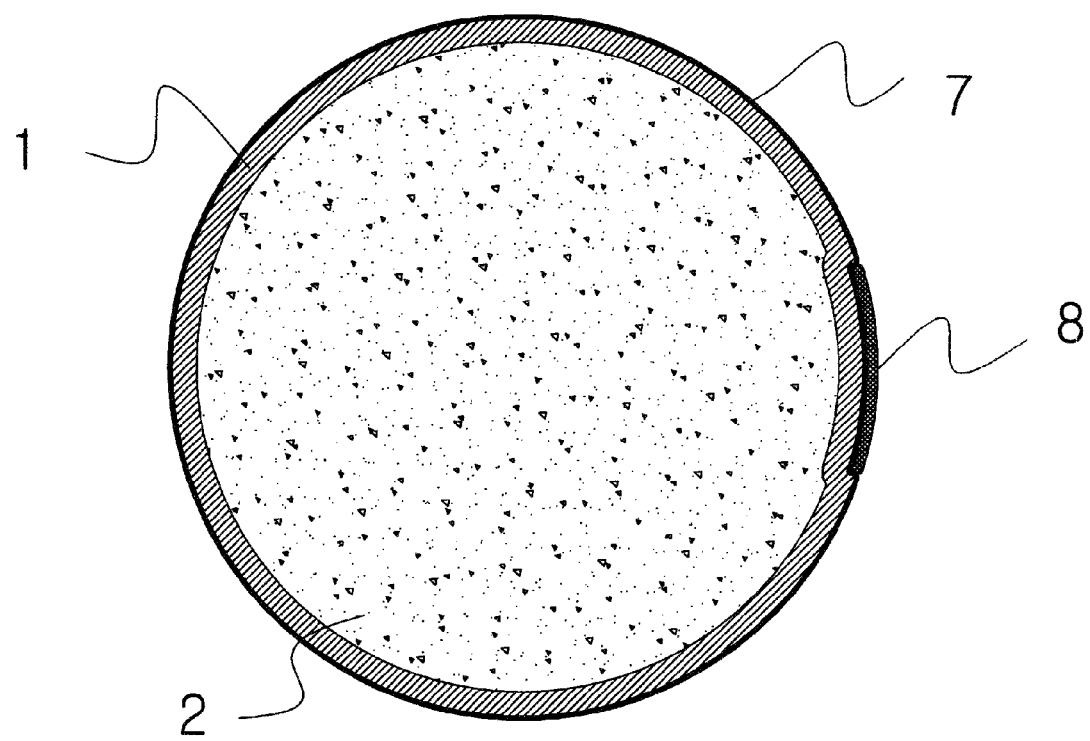
FIG. 2 is a cross-sectional view of the foam play article fabricated according to a preferred embodiment of the present invention.

The thus-formed foamed is separated from the mold and the material injector 5 is removed. A hanger is attached to the foam and then the foam is hung on the conveyer through the hanger. A coating layer 7 (shown in FIG. 2) is coated on the elastic tube of the foam by a coating process including, for instance, a spray method and a soaking method.

A variety of coating solutions can be used. For example, polyurethane resin, solvents, and additives are mixed at a predetermined ratio to form polyurethane dispersion (P.U.D) as a coating solution. Preferably, the P.U.D includes about 10-50% to of polyurethane resin and about 50-90% of a first solvent such as industrial water ($H_2O$), and about 0.1-10% of defoaming agents. Optionally, it may include about 1-20% of a second solvent such as dimethyl formamide (DMF) depending on production condition, production environment and/or user's request Next, the foam with the coated layer passes through a dry chamber to dry the coating layer so as to have an improved elasticity and superior gloss.

After the drying process, a finishing process is performed. More particularly, the hanger is removed and the material injector is cut. A character or sticker 8 is then attached to the cut portion to shield the cut portion.

Subsequent to the finishing process, a second coating process is performed with an appropriate coating solution and then a second drying process is performed to form foam play article having superior surface gloss, improved waterproof, soft tactile sensation, and higher stability.

While the preferred embodiments of the present invention are described with regard to the method in which polyurethane materials are first foamed in an elastic tube and then the surface of the foam is coated, it should be noted that the present invention encompasses the method in which the order of the steps are reversed. More specifically, for example, polyurethane is molded in a mold 6, an adhesive is applied thereto, and the thus-obtained is placed inside the elastic tube to generate the coating layer 7 thereon.

It will be apparent to those skilled in the art that various modifications and variations can be made in the present disclosure. Thus, it is intended that the present disclosure covers the modifications and variations of this disclosure provided they come within the scope of the appended claims and their equivalents.

What is claimed is:

1. A method of fabricating a foam play article, the method comprising:
   providing polyurethane foam materials;
   attaching a material injector to an elastic tube;
   injecting a predetermined amount of the polyurethane foam materials to the elastic tube through the material injector;
   placing the elastic tube in a mold to form a foam;
   applying a coating layer onto an outer surface of the foam; and
   drying the coated foam.

2. The method of claim 1, wherein the polyurethane materials include a first material comprising liquid methylene diisocyanate and a second material comprising polypropylene glycol, and polymer polyol.

3. The method of claim 2, wherein the second material further comprises at least one of amine polyol, tri-ethylene diamine, silicone surfactant, diethanol amine, and chlorofluorohydro-carbon (CFC).

4. The method of claim 3, wherein the polyurethane materials include about 10-50 wt % of the first material and about 50-90 wt % of the second material.

5. The method of claim 4, wherein the second material comprises about 50-90% of poly propylene glycol, about 10-50 wt % of polymer polyol, about 0.1-10 wt % of tri-ethylene diamine, about 0.1-10 wt % of silicone surfactant, 0.1-10 wt % of diethanol amine, and 0.1-10 wt % of foaming agent.

6. The method of claim 1, further comprising removing a gas generated during the foam process before applying the coating layer onto the outer surface of the foam.

7. The method of claim 1, further comprising removing the material injector and attaching the foam to a hanger to be fixed on a conveyer before applying the coating layer onto the outer surface of the foam.

8. The method of claim 1, wherein the applying of the coating layer onto the outer surface of the foam is performed by spraying or soaking.

9. The method of claim 1, wherein the drying of the coated foam is performed by passing through a dry chamber.

10. The method of claim 1, further comprising applying an additional coating layer onto the outer surface of the foam after drying the coated foam.

11. The method of claim 10, further comprising removing the hanger, cutting the material injector, attaching a sticker before applying an additional coating layer.

12. The method of claim 11, further comprising drying the coated foam after applying the additional coating layer.

13. The method of claim 1, wherein the mold includes a gas removing hole for removing a gas generated during the foam process, an air band hole for accurately forming an inner surface of the mold, and a cavity for attaching a sticker.

14. The method of claim 13, wherein a portion of the article corresponding to position of the cavity is coated after the sticker is attached so as to close a tube injection hole.

* * * * *